June 28, 1960 T. EVANS ET AL 2,942,483
DRIVE MECHANISM
Filed Nov. 28, 1958 4 Sheets-Sheet 1

INVENTORS
THOMAS EVANS
CHARLES W. DOERING
ROBERT E. BEACH
BY
ATTORNEYS

June 28, 1960 T. EVANS ET AL 2,942,483
DRIVE MECHANISM
Filed Nov. 28, 1958 4 Sheets-Sheet 2

INVENTORS
THOMAS EVANS
CHARLES W. DOERING
ROBERT E. BEACH
BY Carlsen + Hagle
ATTORNEYS June 28, 1960  T. EVANS ET AL  2,942,483
DRIVE MECHANISM
Filed Nov. 28, 1958  4 Sheets-Sheet 3
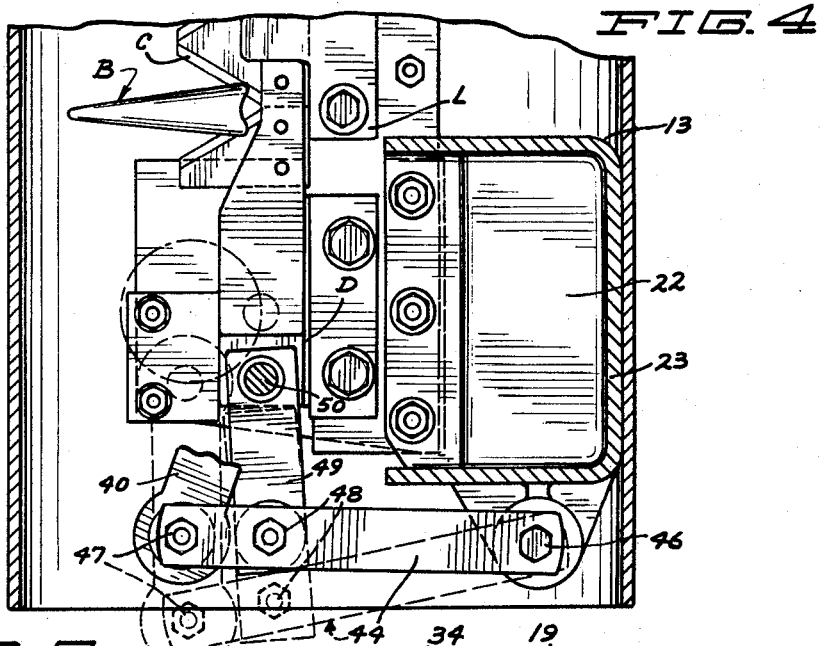
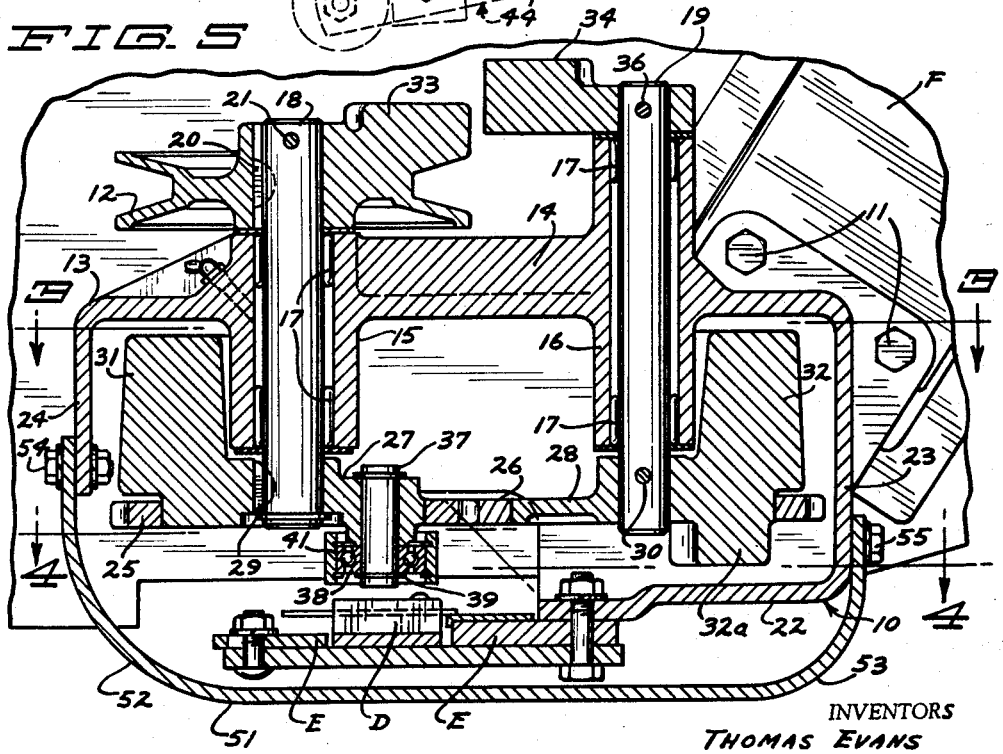
INVENTORS
THOMAS EVANS
BY CHARLES W. DOERING
ROBERT E. BEACH
ATTORNEYS June 28, 1960 T. EVANS ET AL 2,942,483
DRIVE MECHANISM
Filed Nov. 28, 1958 4 Sheets-Sheet 4

INVENTORS
THOMAS EVANS
BY CHARLES W. DOERING
ROBERT E. BEACH

Carlsen & Hagel
ATTORNEYS

United States Patent Office 2,942,483
Patented June 28, 1960

2,942,483

DRIVE MECHANISM

Thomas Evans, Charles W. Doering, and Robert E. Beach, Minneapolis, Minn., assignors to Minneapolis-Moline Company, Hopkins, Minn., a corporation of Minnesota Filed Nov. 28, 1958, Ser. No. 776,974

10 Claims. (Cl. 74—40)

This invention relates generally to improvements in drive mechanisms for converting rotary motion to reciprocating motion. A primary example of the need for such drive mechanisms is the operation of the reciprocating sickle bar of a mower or similar crop cutting mechanism, which must in some way be driven from a power rotated shaft forming part of the machine as a whole, and which sickle bar has in the past been operated by a pitman connection to an eccentric upon a rotating element of some kind. The shocks and vibrations set up as the sickle reaches each end of its travel in opposite directions and reverses its travel are so great that the parts are quickly worn and require frequent, expensive replacement, all as well known to those skilled in the art.

It is accordingly the primary object of our present invention to so counterweight the drive mechanism that these shocks and vibrations will be reduced to the vanishing point, practically speaking, with a resulting great saving in wear on all parts associated with the sickle and its drive mechanism, and smoother running, faster operation and better cutting action on the crop material. Still another object is to provide a drive unit which in and of itself is counterbalanced against vibration, which uses the minimum of parts, particularly expensive anti-friction bearings, and utilizes self-cushioning or vibration-dampening pivot connections wherever possible not only further to reduce vibration but to solve lubrication problems at points where they might otherwise be troublesome. Still another object is to provide a drive having a self-adjusting, and readily adjustable when required, connection to the sickle bar to compensate for wear as it occurs over long periods of use.

These and other more detailed and specific objects will be disclosed in the course of the following specification, reference being had to the accompanying drawings, in which:

Fig. 4 is still another horizontal sectional view taken at a level below that of Fig. 3 and substantially along the line 4—4 in Fig. 5.

Fig. 5 is a vertical sectional view on an enlarged scale and substantially along the line 5—5 in Fig. 2.

Figure 1:
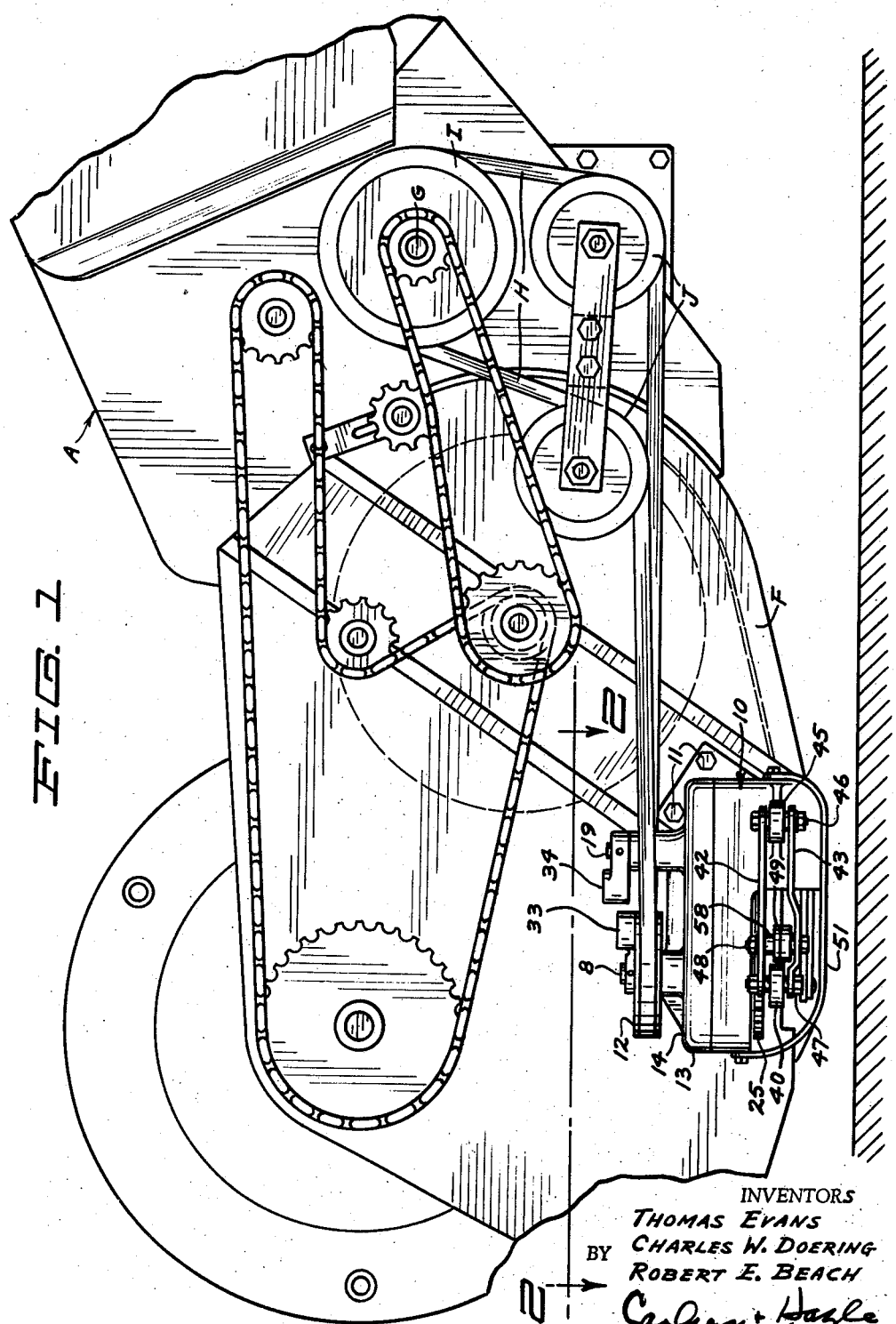
Fig. 1 is a side view of the forepart of an agricultural machine such as a mower, forage harvester or combine of the type conventionally provided with a reciprocating sickle bar forming part of the crop cutting mechanism and illustrating the improved drive mechanism of our invention as applied thereto.

Referring now more particularly and by reference numerals to the drawing, A designates generally the forepart of a wheel supported traveling agricultural machine such as a forage harvester, combine, windrower or mower of the type which uses the conventionally constructed cutting mechanism B for cutting a standing crop to be processed in the machine or left upon the field for subsequent processing by other equipment. The mechanism B extends across the front of the machine and includes a series of cutting blades C upon a transversely reciprocating sickle or cutter bar D operating in a suitable guideway. In most instances heretofore the sickle bar D has been reciprocated by an ordinary and well known pitman drive (not here shown) by which rotary motion taken from one of the rotary, power driven shafts of the machine was used to turn an eccentric with the latter connected by a pitman to one end of the sickle bar. While this kind of drive has been reasonably effective in the past it does not fit in with modern practice because of the rapid wear of the parts due to the shocks created each time the direction of travel of the sickle is reversed, the expense of making replacements and the necessity for smoother, faster operation, all as set forth hereinbefore and as well known to those skilled in this art.

In accordance with our invention we accordingly provide a completely counterbalanced, compact, simple and relatively inexpensive and smooth fast operating drive mechanism designated generally at 10. As one example of the manner in which it may be located on the machine A our drive mechanism or unit 10 is seen as secured at 11 to the side frame F of the machine alongside one end of the cutting mechanism B and driven from a power rotated shaft G by means of a belt H, the rotary motion being then converted to reciprocating motion as necessary in operating the sickle bar D. From a driving pulley I on shaft G the belt H extends downwardly and then is turned forwardly beneath idler pulleys J, the belt being given a half twist to engage a drive pulley 12 on the drive mechanism 10 which pulley operates on an upright axis as seen. This belt drive to the mechanism 10 is for example only and may be varied according to the machine on which the drive is used.

The drive mechanism 10 includes a support or frame 13 of generally rectangular and box-like conformation having a top 14 provided with spaced apart tubular mounts 15 and 16 for spaced apart pairs of anti-friction bearings denoted collectively at 17, through which a pair of parallel rotary members or shafts 18 and 19 are journaled. As here shown these shafts 18 and 19 are spaced one ahead of the other and the aforesaid pulley 12 is secured to the upper end of the foremost shaft 18, as by a key and pin 20—21. The support 13 further includes a bottom 22 (Fig. 5) which extends only part way from the rear end 23 to the front end 24 of the support and above the level of this bottom of the support meshing gears 25 and 26 are secured respectively to the lower ends of the shafts 18 and 19 so that the two shafts must rotate in unison but in opposite directions. Actually the gears 25—26 are ring gears pressed upon castings 27—28 (Fig. 5) which have hubs which are keyed at 29 on shaft 18 and pinned at 30 upon shaft 19. Formed upon or secured to these castings are diametrically opposed, arcuate, upwardly extending lower or main counterweights 31 and 32.

Figure 2:
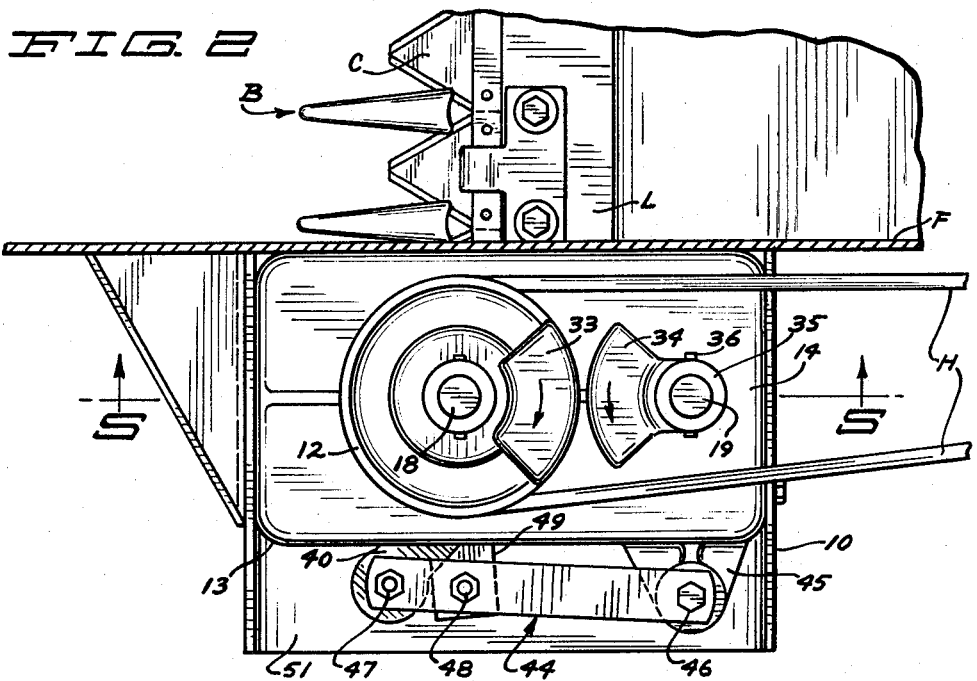
Fig. 2 is an enlarged fragmentary plan view taken substantially along the line 2—2 in Fig. 1.
Figure 3:
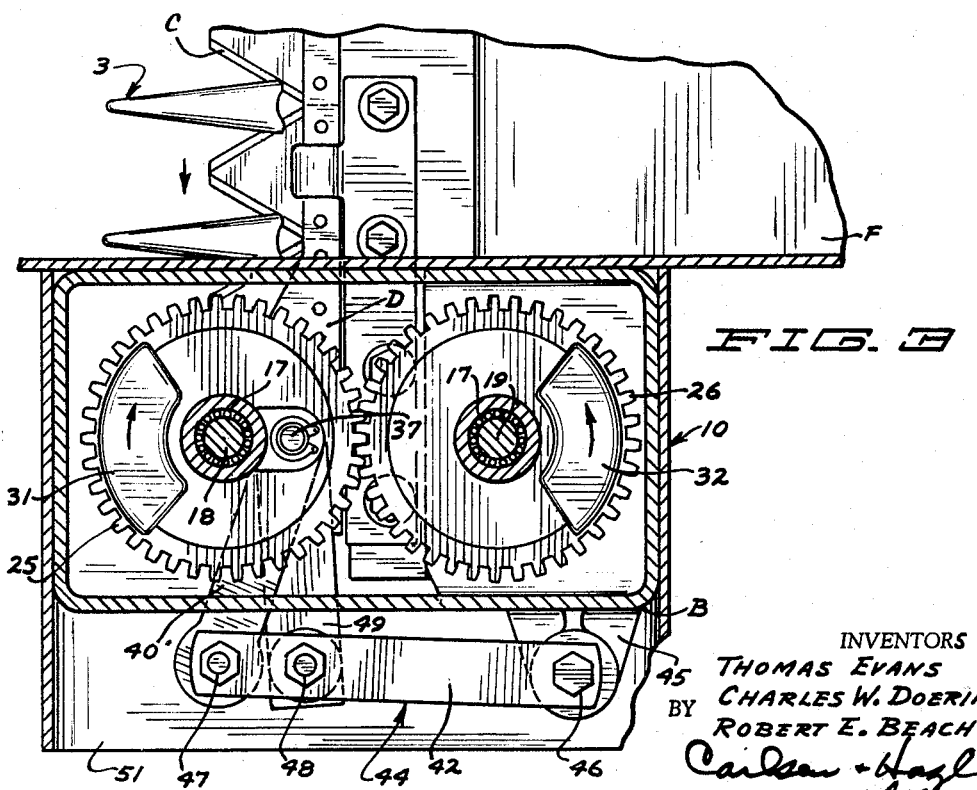
Fig. 3 is a fragmentary horizontal sectional view taken at an intermediate level through the drive mechanism per se and substantially along the line 3—3 in Fig. 5.

For a purpose presently to appear an upper, secondary counterweight 33 is formed on or secured to the pulley 12 and another upper, secondary counterweight 34 is provided with a hub 35 by which it is pinned at 36 to the upper end of the rearmost shaft 19, both of these counterweights 33—34 being also arcuate in shape, oppositely disposed with respect to the axes of the respective shafts 18—19, and also opposed with reference to the lower counterweights 31—32 as will be noted in Fig. 5 and by a comparison of Figs. 2 and 3.

On the gear 25 as made up by the gear ring and its center casting 27 there is disposed an eccentric pin 37 pressed into the casting at a distance radially from the axis of the shaft 18 and depending below said gear. An anti-friction bearing 38 is held by a snap-ring 39 on the lower exposed end portion of this eccentric 37 and forms a pivot attachment for one end of a link 40 which is apertured at 41 (Fig. 5) to receive the bearing. Said link extends outwardly between the forward ends of upper and lower bars 42—43 which together form a rocker designated generally at 44 and the rear end of this rocker is pivoted to an apertured lug 45 on the aforesaid support or frame 13 by means of a pivot bolt or pin 46. The bars 42—43 are located at rear ends respectively above and below said lug 45 and the forward ends of the bars are pivoted by a pivot bolt or pin 47 to the outer end of the link 40.

Adjacent its forward end, but rearwardly of the outer end of the link 40, the rocker 44 is pivoted by a bolt 48 to the outer end of a short pitman bar 49 which extends inwardly and is pivoted at 50 to the outer end of the sickle bar D or some part operatively connected thereto, according to the design of the particular machine using our drive. Details of the pivot connections for the pitman bar will be presently described.

The operating parts of the drive exposed below the support B are protected from contact with the ground or objects thereon by a shoe or sole plate 51 turned upwardly at its front and rear ends 52—53 and bolted to the support by bolts 54—55.

Figure 6:
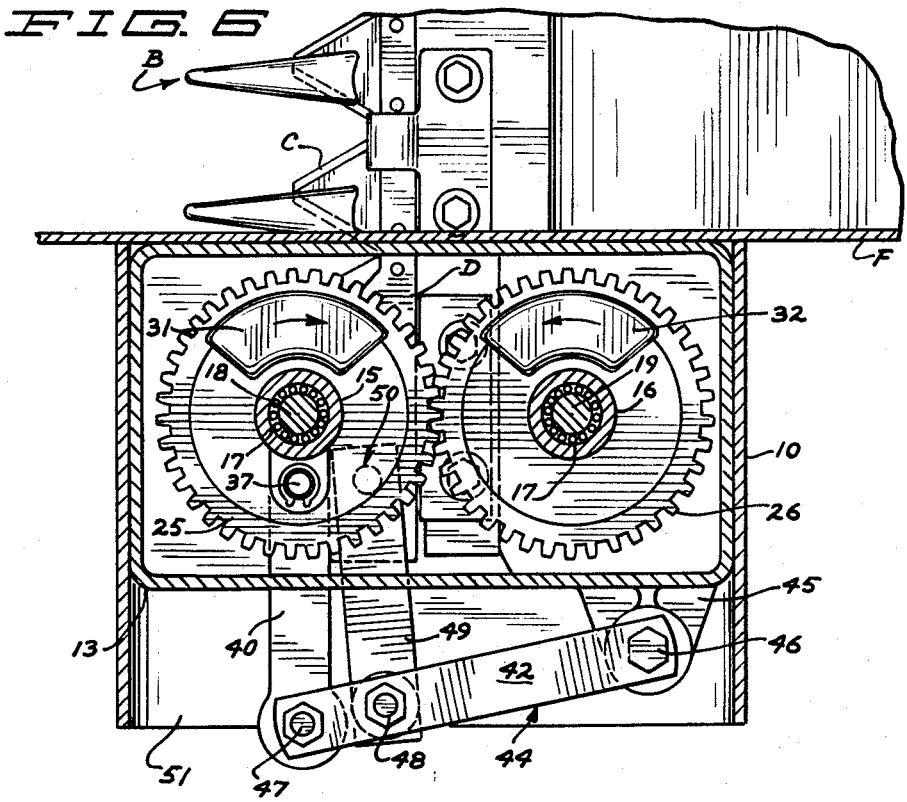
Fig. 6 is a view much like Fig. 3 but showing the parts of the drive mechanism at a different part of their cycle of operations.

In the operation of our drive mechanism it will be obvious that the rotation imparted to the shaft 18 by the drive belt H will rotate the gear 25 so that the eccentric 37 will reciprocate the link 40 to impart an oscillating motion to the rocker 44, causing the latter to swing about its pivot axis 46 and its forward end to swing in a plane substantially parallel to that traveled by the sickle bar D. Thus the connection between the rocker 44 and the sickle bar D, afforded by the relatively very short pitman bar 49, will reciprocate the sickle bar as is necessary for the proper operation of the cutting mechanism B. Since the gears 25—26 are in mesh shaft 19 will also rotate but in an opposite direction, as has heretofore been set forth. Thus as the gears 25—26 rotate the counterweights 31—32 are carried along and they are so positioned with respect to the various pivots of the parts which convert the rotary motion imparted to shaft 37 to reciprocating motion of the sickle bar D, and timed with respect to the sickle bar travel, that the shocks and vibrations set up in the cutting mechanism, as the sickle bar travels and as it reaches each end of its stroke and reverses its direction of travel, will be very effectively balanced out. In effect the rotational travel of the counterweights 31—32 is so timed with respect to the reciprocating travel of the sickle bar D that when the latter is anywhere between the extremities of its travel in either direction the counterweights will substantially oppose each other or be somewhere in the vicinity of the positions illustrated in Fig. 3 (or positions diametrically opposed thereto) and as will be noted from the arrows in Fig. 3 the direction of travel of the counterweights, as indicated by the arrows thereupon, is opposite the direction of travel of the sickle bar as here illustrated and as indicated by the arrow at the cutting mechanism B, so that these weights will effectively counterbalance this travel of the sickle bar. As the sickle bar reaches the ends of its strokes in either direction the counterweights will lie in about the positions illustrated in Fig. 6 (or in positions diametrically opposed to the showing in this view) so that the weights are now moving crosswise with respect to the direction of travel of the sickle bar and balance out each other, coming into play immediately then as the sickle bar begins its travel in either direction. Experience has demonstrated that this arrangement of the counterweights, particularly when associated with a sickle bar which operates rapidly and with short strokes by the drive linkage herein shown, will very effectively smooth the operation and to the point where damage or wear upon the parts is greatly reduced and faster operation made possible.

It will be noted in Fig. 5 particularly that because of the necessary bearings and linkage the main counterweights 31—32 operate in a plane well above the level of the sickle bar D. As a result a rotational couple is set up about an axis extending generally forwardly and rearwardly. There occurs then a tendency of the drive mechanism to vibrate about an axis which as aforesaid extends in a generally forward-rearward direction and this in itself would introduce an undesirable vibration were it not for the fact that the upper counterweights 33—34 are provided and so proportioned as to weight with respect to the mass and weight of the main counterweights 31—32, and are also so disposed with reference to the axes of rotation of the shafts 18—19, that this rotational, vibration producing couple is effectively balanced out. A comparison between Figs. 2 and 3 will bring about an understanding of the relationship of these weights and it will be noted that the weights 33—34 are not only disposed oppositely with respect to the axes of shafts 18 and 19 but are also substantially diametrically opposed to the locations of the weights 31—32. As thus formed and constructed our drive mechanism is found to operate not only smoothly as regards the reciprocation of the sickle bar D but also with respect to forces which are generated within the drive mechanism itself in the process of the translation of the rotary motion to reciprocating motion necessary for our purposes. The counterweight 32 has a downward extension 32$^a$ to make up for the weight of the eccentric 37 and its associated bearing 38, as will be readily understood.

Figure 7:
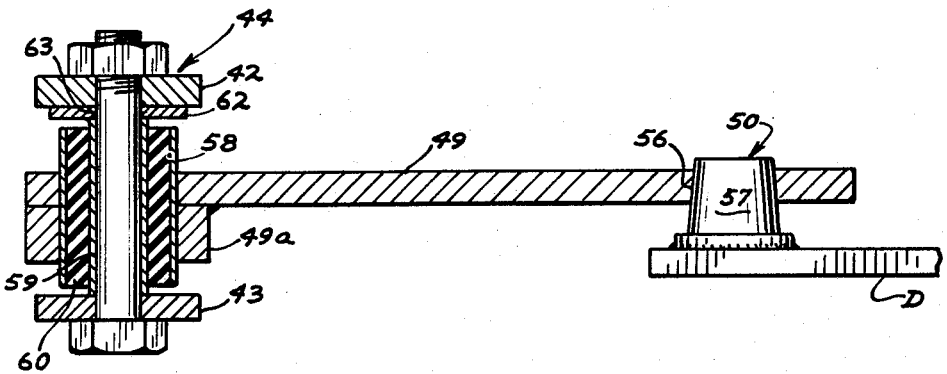
Fig. 7 is an enlarged longitudinal sectional view through the short pitman or connecting bar which actually drives the sickle bar and particularly illustrating the manner in which the pivot connections at the opposite end of this bar are made.

Referring to Fig. 7 it will be noted that the pitman bar 49, where it is pivoted at 50 to the sickle bar D, is formed with a very slightly tapered opening 56 which is pivotally seated upon and over a correspondingly and upwardly tapered stud 57 welded or otherwise secured to the sickle bar. At its opposite outer end the pitman bar 49 is provided with a collar 49$^a$ welded or otherwise secured in place and press fitted upon the outer metal collar 58 of a shock resisting pivot mounting which includes, in addition to said collar 58, an inner collar 59 closely fitting upon the aforesaid bolt 57. These collars 58—59 are bonded to a cylindrical resilient sleeve 60 of rubber or other similar material. It will be noted that the inner collar 59 is longer than the outer collar 58 and that whereas the inner collar is tightly held between the upper and lower bars 42—43 making up the rocker 44 by pulling the bolt 48 up tight, the outer collar 58, upon which the pitman 49 and its bearing 48 are pressed, is spaced from the facing surfaces of the bars 42—43. At least at the upper end of this assembly a washer-like shim 62 of any desired thickness is placed between the upper bar 42 and the inner collar 59 so that when the bolt 48 is tightened and proper shims are used the pitman bar 49 is downwardly biased at its inner end and thus firmly but pivotally seats the opening 56 over the stud 57. Thus the pivot 50 is readily adjustable according to wear occurring over relatively long periods of time and when sufficiently worn, then a thicker shim or shims may be inserted to restore the pitman bar to its original operative condition. This is one advantage of the resilient or rubber mounting forming the outer end pivot for the pitman bar, in addition to which the flexing of the resilient sleeve 60 solves one of the troublesome lubrication problems which is encountered in mechanisms of this kind where the pivotal or swinging motion is very slight.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. For converting rotary to reciprocating motion, drive mechanism comprising a support, a pair of parallel members journaled on the support, gears connecting said members to cause said members to rotate in unison, means for rotating one of said members, means connected to one of said members to act as an eccentric and provide reciprocating motion, opposed counterweights on the gears to balance out vibration from action of the eccentric, and separate counterweights on said members opposed to the first mentioned counterweights to balance out oscillating tendencies of the drive mechanism as the rotary motion thereto is converted to reciprocating motion.

2. For converting rotary to reciprocating motion, drive mechanism comprising a support, a pair of parallel shafts journaled on the support, gears connecting corresponding end portions of said shafts to cause the shafts to rotate in unison, drive means for rotating one of said shafts, means connected to the same shaft to act as an eccentric and provide reciprocating motion for a driven part, opposed main counterweights on the gears to balance out vibration from action of the eccentric, and separate secondary counterweights on said shafts to balance out oscillating tendencies of the drive mechanism as the rotary motion thereto is converted to reciprocating motion, said last mentioned counterweights being opposed to the first mentioned counterweights with respect to the axes of the shafts and being spaced apart lengthwise of the shafts.

3. A drive mechanism for converting rotary motion of a driving member to reciprocation of a driven member, comprising a support, a pair of parallel journaled members carried by the support, means for rotating one of said parallel members from said driving member, an eccentric driven by one of said parallel members and operatively connected to reciprocate said driven member, means connecting the parallel members for rotation in unison and in opposite directions, and four counterweights connected to rotate two with each of the parallel members adjacent opposite ends thereof and each of the two counterweights associated with each parallel member being located substantially in diametrically opposed relationship with respect to the axis of rotation of said parallel member.

4. A drive mechanism for converting rotary motion of a driving member to reciprocation of a driven member, comprising a support, a pair of parallel rotatable shafts carried by the support, means connected to one end of one shaft for rotating the same from said driving member, an eccentric driven by the opposite end of the shaft and operatively connected to reciprocate said driven member, means connecting the shafts for rotation in unison and in opposite directions, and four counterweights connected to rotate two with each of the shafts adjacent opposite ends thereof and each of the two counterweights associated with the end of each shaft being located substantially in diametrically opposed relationship with respect to the axis of rotation of said shafts.

5. A drive mechanism for converting rotary motion of a driving member to reciprocation of a driven member, comprising a support, a pair of parallel rotatable shafts carried by the support, means connected to one end of one shaft for rotating the same from said driving member, an eccentric driven by the opposite end of said one shaft and operatively connected to reciprocate said driven member, means connecting the shafts for rotation in unison and in opposite directions, four counterweights connected to rotate two with each of the shafts adjacent opposite ends thereof and each of the two counterweights associated with the end of each shaft being located substantially in diametrically opposed relationship with respect to the axis of rotation of said shafts, and the counterweights at one end of the shafts being opposed to the counterweights at the other ends of the shafts.

6. Drive mechanism of the character described for translating rotary motion from a drive member to reciprocating motion of a driven member, comprising a support, a pair of parallel shafts, means journaling the shafts on the support for independent rotation, means at one end of one shaft for rotating said shaft from said drive member, means at the opposite end of said shaft providing an eccentric, a driving connnection from said eccentric to reciprocate said driven member, meshing gears on the shafts in substantially the plane of said eccentric to rotate said shafts in opposite directions, a first pair of opposed counterweights on the gears for balancing out the vibration as the direction of movement of the reciprocating driven member is reversed, and a second pair of counterweights at substantially the plane of said drive means and opposed to the first pair of counterweights for balancing the drive mechanism itself against any rotative couple set up therein in a plane at right angles to and across the axes of said shafts.

7. Drive mechanism of the character described for translating rotary motion from a drive member to reciprocating motion of a driven member such as a sickle or cutter bar, comprising a support, a pair of parallel upright shafts, means journaling the shafts on the support for independent rotation, a pulley on the upper end of one shaft for rotating said shaft from said drive member, meshing gears on the lower ends of said shafts, an eccentric on one gear, a connection from said eccentric to reciprocate said driven member, a first pair of opposed counterweights on the gears for balancing out the vibration as the direction of movement of the reciprocating driven member is reversed, and a second pair of counterweights on the upper end portions of the shafts and opposed to the first pair of counterweights for balancing the drive mechanism itself against any rotative couple set up therein in a generally horizontal plane at right angles to the axes of said shafts.

8. Drive mechanism of the character described for translating rotary motion from a rotary drive member to reciprocating motion of a reciprocating sickle bar, comprising a support, a pair of upright parallel shafts, means journaling the shafts on the support for independent rotation, means at the upper end of one shaft for rotating said shaft from said drive member, means at the lower end of said shaft providing an eccentric, a connection from said eccentric to reciprocate said sickle bar, meshing gears on the lower ends of the shafts to cause said shafts to rotate in opposite directions, a first pair of opposed counterweights on the gears for balancing out the vibration as the direction of movement of the reciprocating sickle bar is reversed, and a second pair of counterweights on the upper ends of said shafts and opposed to the first pair of counterweights with respect to the axes of the shafts and for balancing the drive mechanism itself against any rotative couple set up therein in a horizontal plane at right angles to the axes of said shafts.

9. Drive mechanism of the character described for translating rotary motion from a drive member to reciprocating motion of a driven member, comprising a support, a pair of parallel shafts, means journaling the shafts on the support for independent rotation, means for driving one of the shafts from said drive member and means for driving said driven member from one of the shafts, gears connecting the shafts to rotate in unison, a first pair of opposed counterweights connected to one end portion of the shafts to balance out vibration as the driven member reciprocates, and a second pair of counterweights connected to the opposite end portions of the shafts and opposed to each other as well as to said first counterweights to balance out any rotative couple in the drive mechanism itself.

10. For converting rotary to reciprocating motion, drive mechanism comprising a support, a pair of parallel shafts journaled on the support, gears connecting corresponding end portions of said shafts to cause the shafts to rotate in unison, drive means for rotating one of said shafts, means connected to the same shaft to act as an eccentric and provide reciprocating motion for a driven part, opposed main counterweights on the gears to balance out vibration from action of the eccentric, and separate secondary counterweights on said shafts to balance out oscillating tendencies of the drive mechanism as the rotary motion thereto is converted to reciprocating motion, said last mentioned counterweights being opposed to the first mentioned counterweights with respect to the axes of the shafts and being spaced apart lengthwise of the shafts, and weight adding means on one of said main counterweights to balance out the weight of said eccentric.

References Cited in the file of this patent

UNITED STATES PATENTS

| | | |
|---|---|---|
| 2,020,149 | Leighton | Nov. 5, 1935 |
| 2,206,386 | Bernard | July 2, 1940 |
| 2,664,690 | Huddle et al. | Jan. 5, 1954 |
| 2,745,238 | Hopkins | May 15, 1956 |
| 2,790,295 | Collins | Apr. 30, 1957 |

FOREIGN PATENTS

| | | |
|---|---|---|
| 652,391 | Germany | Oct. 29, 1937 |
| 846,178 | Germany | Aug. 11, 1952 |